(12) United States Patent
Goh et al.

(10) Patent No.: US 12,147,615 B2
(45) Date of Patent: *Nov. 19, 2024

(54) INFORMATION HANDLING SYSTEM STYLUS BODY WITH FLEXIBLE BUTTON ACTUATOR

(71) Applicant: Dell Products L.P., Round Rock, TX (US)

(72) Inventors: Peng Lip Goh, Singapore (SG); Gerald R. Pelissier, Mendham, NJ (US); Mark J. Law, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,867

(22) Filed: Apr. 19, 2022

(65) Prior Publication Data

US 2023/0333672 A1    Oct. 19, 2023

(51) Int. Cl.
*G06F 3/044* (2006.01)
*G06F 3/0354* (2013.01)
*G06F 3/038* (2013.01)
*G06F 3/041* (2006.01)

(52) U.S. Cl.
CPC ........ *G06F 3/03545* (2013.01); *G06F 3/0383* (2013.01); *G06F 3/0412* (2013.01); *G06F 3/04162* (2019.05); *G06F 3/0441* (2019.05); *G06F 3/0442* (2019.05)

(58) Field of Classification Search
CPC .. G06F 3/0346; G06F 3/0488; G06F 3/03545; G06F 3/0441; G06F 3/0442; G06F 1/3203; G06F 3/044
See application file for complete search history.

(56) References Cited

U.S. PATENT DOCUMENTS

| | | | |
|---|---|---|---|
| 3,921,108 A * | 11/1975 | O'Connor | H01H 36/004 368/241 |
| 5,353,460 A * | 10/1994 | Bauman | A61C 17/349 15/28 |
| 8,284,951 B2 | 10/2012 | Schaack et al. | |
| 8,773,405 B1 | 7/2014 | Ryshtun et al. | |
| 9,201,520 B2 | 12/2015 | Benko et al. | |
| 9,727,161 B2 | 8/2017 | Hinckley | |
| 10,133,385 B1 | 11/2018 | Maloney et al. | |
| 10,365,732 B2 | 7/2019 | Bernstein et al. | |
| 11,662,838 B1 * | 5/2023 | Goh | G06F 3/0441 345/179 |
| 11,662,839 B1 * | 5/2023 | Goh | H04R 1/08 345/174 |
| 11,733,788 B1 * | 8/2023 | Goh | G06F 3/03545 345/179 |
| 11,772,409 B2 * | 10/2023 | Neubauer | G09B 23/02 434/335 |

(Continued)

*Primary Examiner* — Olga V Merkoulova
(74) *Attorney, Agent, or Firm* — Zagorin Cave LLP; Robert W. Holland

(57) ABSTRACT

An information handling system stylus includes components to support active tip writing inputs at a touchscreen display controller by buttons integrated in the stylus housing as a thin material formed contiguous with the stylus housing material. A leaf spring biases upwards at the button thin material and has a magnet coupled to it that, upon a press at the button, is detected as increased magnetic flux by a magnetic sensor disposed under the leaf spring.

18 Claims, 10 Drawing Sheets

(56) References Cited

U.S. PATENT DOCUMENTS

| | | | |
|---|---|---|---|
| 11,853,484 B2 * | 12/2023 | Arai | H05K 3/284 |
| 2014/0168176 A1 | 6/2014 | Nowatzyk | |
| 2015/0185879 A1 | 7/2015 | Aurongzeb et al. | |
| 2017/0068342 A1 | 3/2017 | Zimmerman et al. | |
| 2018/0024650 A1 * | 1/2018 | Hou | G06F 3/0383 |
| | | | 345/179 |
| 2018/0081456 A1 | 3/2018 | Le et al. | |
| 2018/0364823 A1 * | 12/2018 | Kamiyama | G06F 3/0383 |
| 2019/0101971 A1 * | 4/2019 | Shahparnia | G06F 3/03545 |
| 2019/0294269 A1 * | 9/2019 | Ninomiya | G06F 3/03545 |
| 2020/0081560 A1 | 3/2020 | Geller et al. | |
| 2020/0174588 A1 * | 6/2020 | Oda | G06F 3/041 |
| 2020/0218364 A1 | 7/2020 | Kim et al. | |
| 2020/0345944 A1 | 11/2020 | Helmer | |
| 2021/0117019 A1 * | 4/2021 | Arai | H05K 3/284 |
| 2021/0165504 A1 * | 6/2021 | Trethewey | G06F 3/0346 |
| 2021/0291579 A1 * | 9/2021 | Neubauer | G09B 23/02 |
| 2021/0333892 A1 * | 10/2021 | Yamamoto | G06F 3/03545 |
| 2022/0276729 A1 | 9/2022 | Gutierrez et al. | |

\* cited by examiner

INFORMATION HANDLING SYSTEM STYLUS BODY WITH FLEXIBLE BUTTON ACTUATOR

BACKGROUND OF THE INVENTION

Field of the Invention

The present invention relates in general to the field of portable information handling systems, and more particularly to an information handling system stylus body with flexible button actuator.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility. Convertible information handling systems can also include a touchscreen display that accepts end user inputs as touches at information presented by the display.

One tool used to interact with a touchscreen display is a stylus that writes like a pen by touching a tip at the touchscreen display. An advantage of a stylus, as opposed to a finger, is that a stylus has a more precise input point and mimics conventional pens that write ink to paper. The precision of inputs is provided by a small point of the writing tip and enhanced by transmitting a signal from the writing tip that is detected by the touchscreen display, such as a capacitive sensor that, in essence, detects near field effects. In addition, a stylus can enhance end user inputs through wireless communications with the information handling system, such as with BLUETOOTH. As an example, a stylus typically includes a push button near the tip than an end user can activate to change the writing input accepted by the information handling system, such as commanding a thicker or thinner drawn line or a different color. Other push buttons on the stylus control power and BLUETOOTH connectivity, such as commanding advertising. One difficulty with the inclusion of complex functionality and pressable buttons in a stylus is that the stylus housing should mimic a pen or other writing utility with a small round housing and minimal weight. Robust interactive buttons generally add weight and size to the housing around the button location and at an increased cost. Deploying processing capabilities in a pen-sized housing can prove difficult and expensive. In addition, the processing capability tends to have increased power draw that reduces battery life and can result in selection of larger battery sizes. One way to address this larger power draw is to sleep the stylus when not in use, however, this often introduces confusion and inconvenience to an end user who has to press a button to wake the stylus or experiences a delay in active inking while the stylus wakes.

Another difficulty that tends to arise with use of an active stylus is arranging to charge the battery. Including a port to interface with a charging cable tends to increase the housing size and impact the stylus usability. An alternative charging technique is to place the stylus next to a wireless charger and communicate charge wirelessly. For example, the stylus may be placed on a wireless charger pad on a desktop next to an information handling system that also receives a wireless charge. As another example, a magnet in the stylus may be used to attach the stylus to a side of an information handling system that has a wireless charger to communicate charge to the stylus. Since a stylus has a round and small shape that mimics a pen, a stylus can roll off of charging pad or fall from a magnetic attachment and become lost, such as by rolling away from the end user on the floor so that it is difficult to locate.

SUMMARY OF THE INVENTION

Therefore, a need has arisen for a system and method which supports a stylus having input buttons formed in a housing of contiguous material.

A further need exists for a stylus that manages power use with context derived in part by accelerometer and audio information.

In accordance with the present invention, a system and method are provided which substantially reduce the disadvantages and problems associated with previous methods and systems for assembly of a stylus. A housing of contiguous material of a first thickness has inputs defined at portions of a second thickness of a thinner amount of material to flex in response to an end user press. The input buttons couple to a subassembly that slides into an opening of the stylus housing with a spring aligned to the area of reduced material thickness that biases the button outward. A magnet coupled to spring presses inward towards a magnetic sensor that detects increased magnetic flux at an input press.

A further improvement to the art is provided by accelerometer and microphone monitoring of stylus context to manage power state and stylus battery discharge. Logic stored in non-transitory memory and executed on a processing resource integrated in the accelerometer monitors for acceleration profiles based upon a static or dynamic environment of the stylus. A microphone monitors for sounds associated with certain contexts, such as rolling or falling stylus, to supplement the context determination. A variety of power consumption states are applied that reduce power draw while offering a rapid response of the stylus for end user inking.

More specifically, a portable information handling system processes information with processing components disposed in a planar housing, such as a central processing unit that executes instructions to process information and a random access memory that stores the instructions and information. A touchscreen display disposed on one side of the planar housing presents the information as visual images and accepts touches as inputs. A stylus having a writing tip exposed at one end of a cylindrical housing provides touch inputs at the touchscreen display in a manner that mimics a pen and with an active tip that enhances capacitive touch detection. The stylus has a single shot plastic housing formed as a cylinder with a writing tip opening at a first end and an end cap opening at an opposing second end. A subassembly with a circuit board, a writing tip and an end cap slides into the housing at the second end to expose the writing tip at the first end and enclose the circuit board with the end cap at the second end. The circuit board includes first and second input buttons that align with portions of the housing having a reduced thickness with a leaf spring of each input button pressing outward at the area of reduced thickness so that an input press flexes the housing material inward to push the leaf spring towards the circuit board. A magnet coupled to the leaf spring has closer proximity to a magnetic sensor, such as magnetometer or Hall sensor, when a press is made at the input button so that an input is detected at the circuit board. The circuit board has a main processing resource, such as an MCU, an accelerometer and an audio processor interfaced with a microphone. The accelerometer applies acceleration profiles using an integrated processing resource to manage power, such as waking and sleeping the main processing resource and radio based upon detected accelerations and other context monitored with the accelerometer processing resource while the main processing resource and the radio sleep. Similarly, the microphone applies audible profiles, such as the sound of a rolling stylus or a stylus to ground impact, to monitor a context of the stylus. Wake times for the main processing resource and wake events may be managed by GPIO commands from the accelerometer and/or microphone so that the main processing resource can analyze context when awake and reset the acceleration and sound profiles used by the accelerometer processing resource when the main processing resource sleeps.

The present invention provides a number of important technical advantages. One example of an important technical advantage is that an information handling system stylus assembles a subassembly into a housing with a simple sliding motion to have input buttons of the subassembly aligned with thin material portions of the housing. The thin material flexes slightly to provide an input signal by pressing a magnet towards a magnetic sensor with minimal wear on the housing material over time, thus providing a simple, reliable and robust input button. The stylus manages power draw in an efficient manner by reference to acceleration and audio profiles associated with contexts having predictable behaviors. For example, a static environment with fewer accelerations might minimize power draw in an idle state by relying only on logic executing in a processing resource of an accelerometer while a dynamic environment might use more frequent wakes to analyze context and reset the acceleration and audio profiles. This provides minimal battery draw yet offers rapid response in the event of an end user initiating use of the stylus to ink on a touchscreen display.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system stylus has a durable structure with integral input buttons coupled to a subassembly and interacting through a thin housing portion, along with battery power management through acceleration and sound context. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
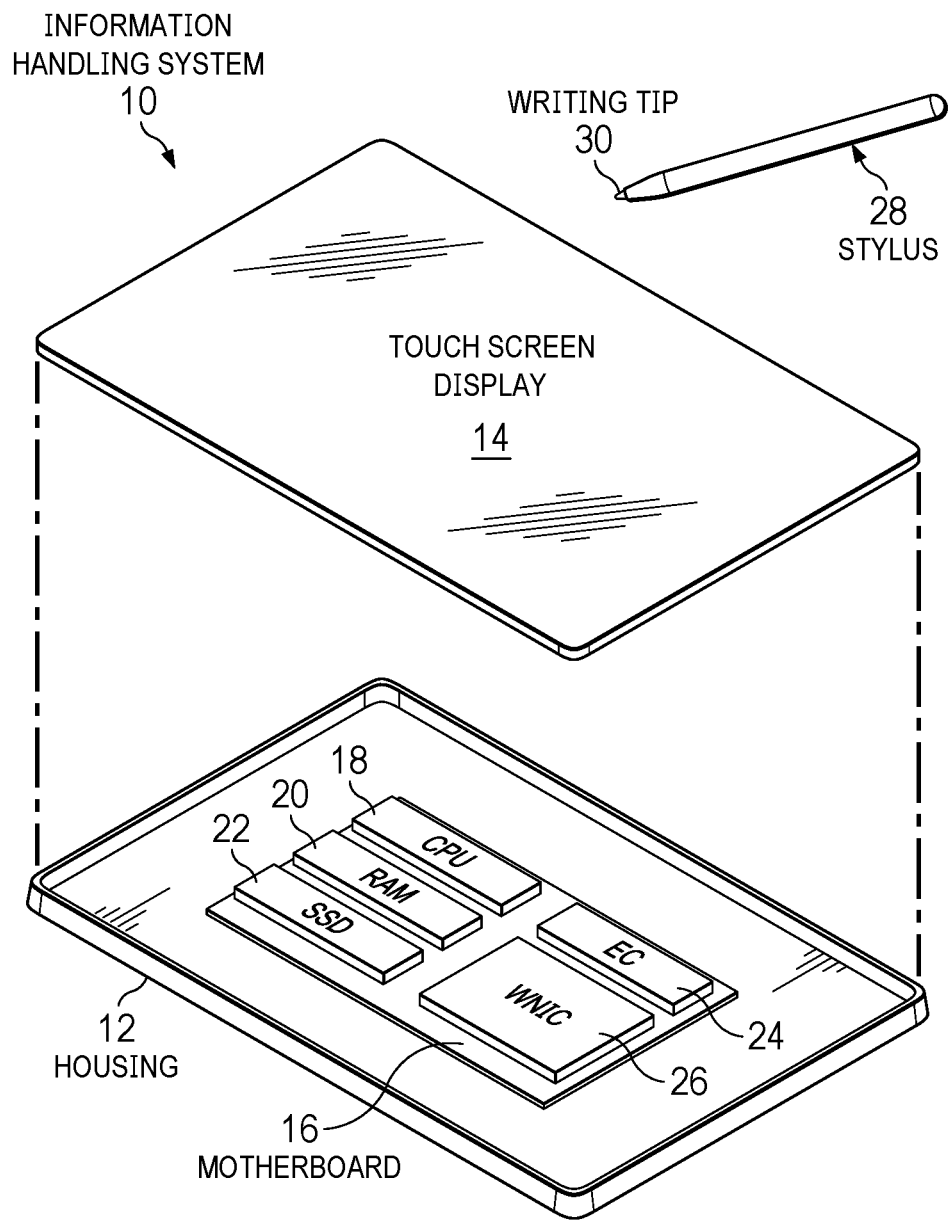
FIG. 1 depicts an exploded perspective view of a portable information handling system and stylus.

Referring now to FIG. 1, an exploded perspective view depicts a portable information handling system 10 and a stylus 28. Portable information handling system 10 is built in a planar housing 12 having a touchscreen display 14 coupled on one side and exposed to accept touch inputs by an end user. A motherboard 16 couples within housing 12 to interface processing components that cooperate to process information. For instance, in the example embodiment, a central processing unit (CPU) 18 executes instructions to process information in cooperation with a random access memory (RAM) 20 that stores the information and instructions. A solid state drive (SSD) 22 has non-transitory memory that stores the information and instructions during power down, such as an operating system that is retrieved to RAM 20 at system boot. An embedded controller 24 manages physical interactions between components, such as with application of power and management of thermal constraints. Embedded controller 24 supports interactions by CPU 18 with input/output (I/O) devices, such a keyboard, mouse and the touch controller of touchscreen display 14 that reports touch inputs. A wireless network interface controller (WNIC) 26 provides wireless signal communication with external devices, such as through WiFi and Bluetooth protocols.

Stylus 28 has a writing tip 30 extending from one end of a cylindrical housing that mimics a pen. Writing tip 30 provides a more precise point of contact at touchscreen display 14 than is available by a finger touch so that end user inputs can include writing and drawing as if on a piece of paper. In the example embodiment, writing tip 30 has enhanced touch input accuracy by outputting a signal generated from internal components that improve capacitance touch detection. The signal from writing tip 30 is generated with a battery included in stylus 28 that is periodically charged and managed by touch buttons on stylus 28 that exchange wireless commands with information handling system 10. For example, stylus 28 has a power button that also commands Bluetooth functions, such as pairing, and an inking button that allows an end user to control line width, as an example, with touch inputs at stylus 28 that are communicated to information handling system 10. In the example embodiment, stylus 28 has a magnetic "garage" located at one side of housing 12 so that magnetic attraction holds stylus 28 in place when not in use. A wireless charger near the garage provides a wireless power charge to stylus 28 to charge its internal battery when garaged. In this manner, stylus 28 is ready for an end user to grasp and use as desired with a full charge available to perform active capacitive writes from writing tip 30.

Figure 2:
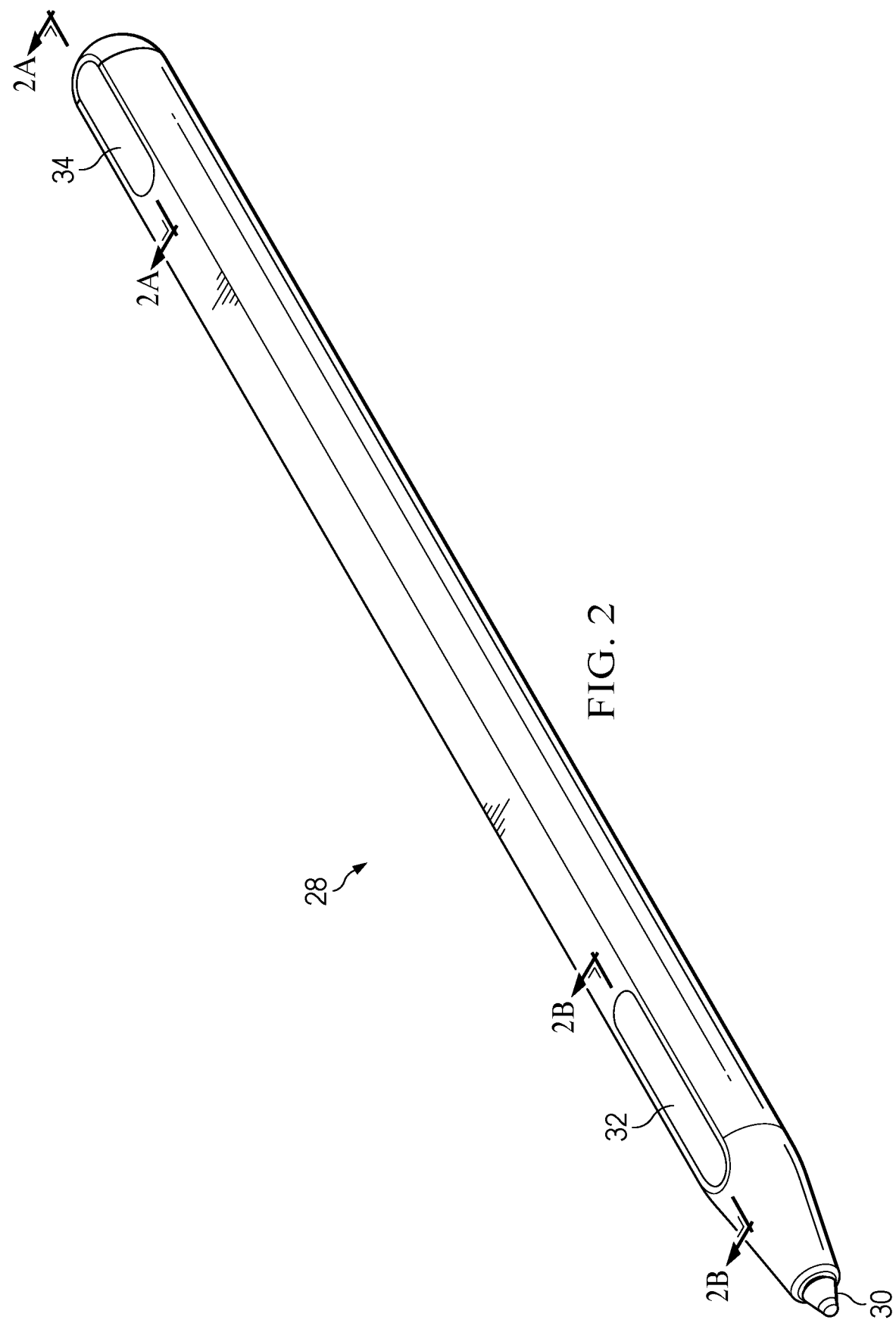
FIG. 2 depicts a front perspective view of the stylus.

Referring now to FIG. 2, a front perspective view depicts the stylus 28. Stylus 28 is built in a cylindrical housing having a writing tip opening at one end through which writing tip 30 extends and an end cap opening at an opposing end that is covered by an end cap, as described in greater detail below. A first input button 32 is located proximate writing tip 30, and a second input button 34 is located at the end opposite writing tip 30. In various embodiments, each input button may have different controls for stylus 28, such as adjusting inking width and/or color, turning power on and off, and managing Bluetooth advertising and pairing. In the example embodiment, stylus 28 has a cylindrical shape that includes a partially flat surface that rests against the information handling system housing when garaged. Alternative embodiments may include additional input buttons and alterations to the shape, although generally a cylindrical shape that mimics a pen, as depicted, tends to meet end user expectations for writing at a touchscreen display. In the example embodiment, input buttons 32 and 34 are manufactured contiguous with the rest of the stylus housing as a thinner material, such as with a single shot injection mold of plastic that defines a first material thickness for the housing and a second material thickness for the input buttons that is less than the first material thickness. The thinner material thickness at input buttons 32 and 34 flexes in response to a press to pass an end user input to an input button assembly within the stylus housing, such as is described below in greater depth.

Figure 2A:
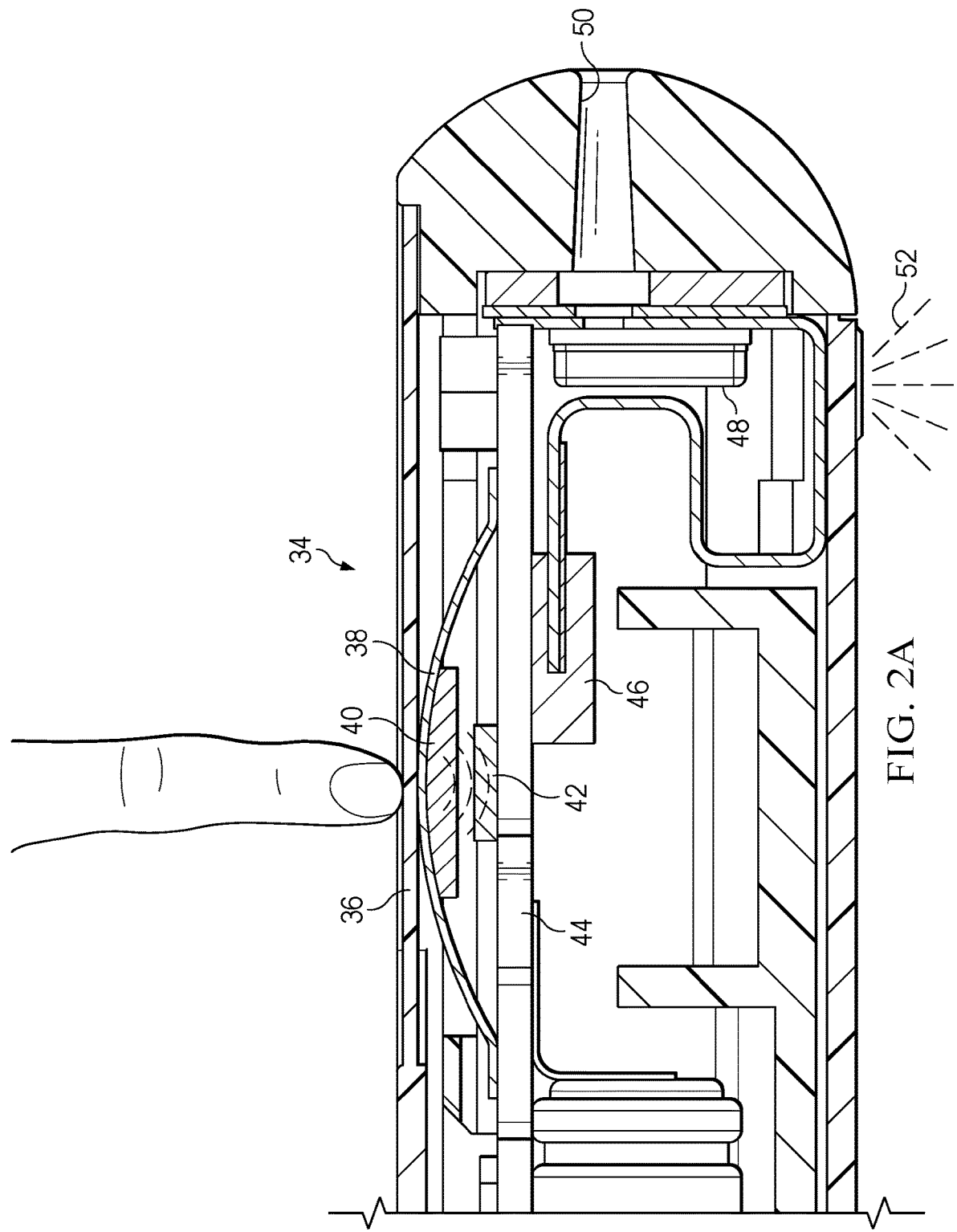
FIGS. 2A and 2B depict side cutaway views of the stylus configured to accept inputs at an input button.
Figure 2B:
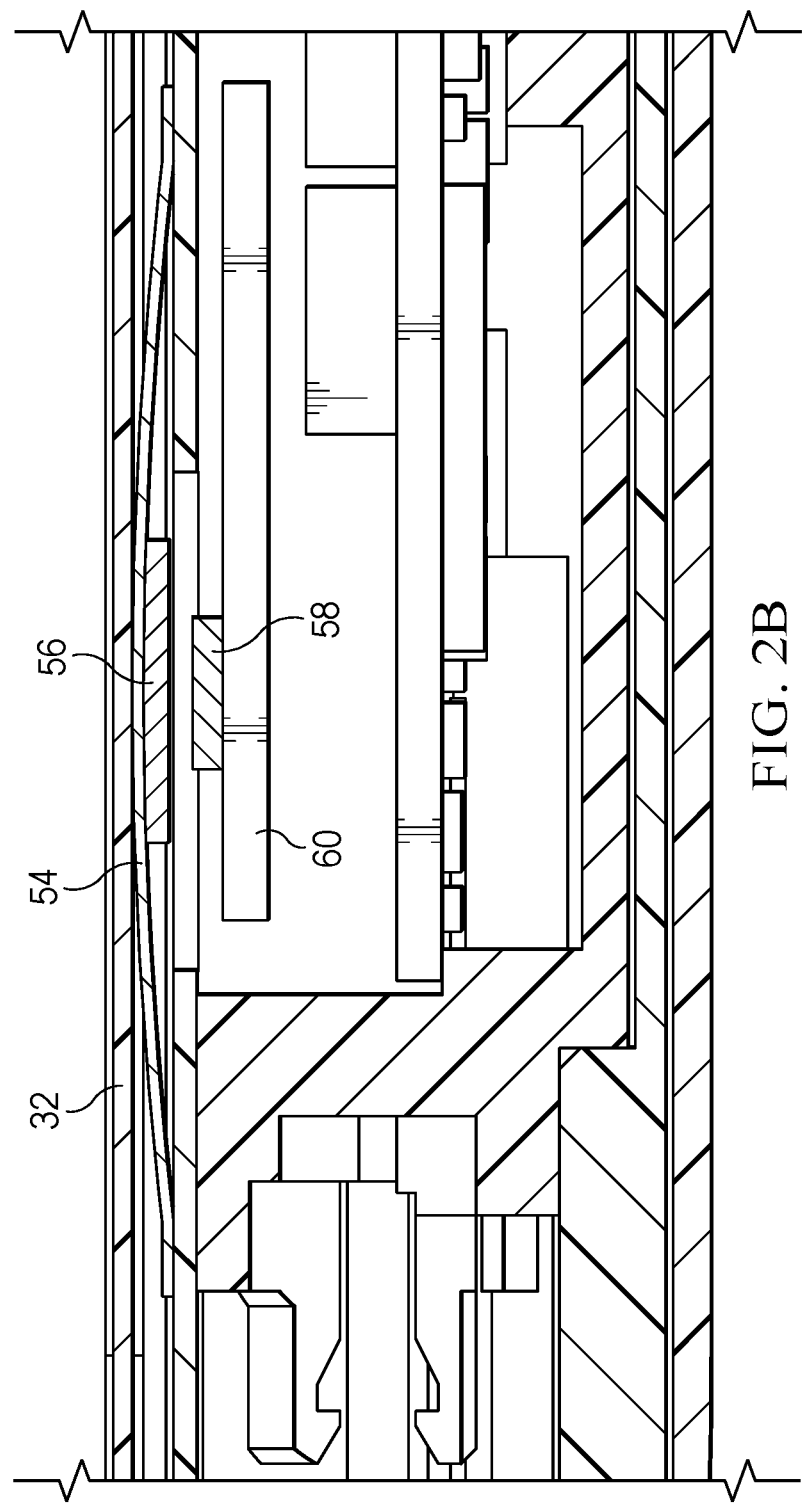

Referring now to FIGS. 2A and 2B, side cutaway views depict the stylus configured to accept inputs at an input button as indicated by the cross-sectional lines of FIG. 2. FIG. 2A depicts a cross-sectional view of input button 34 having a thin-walled section 36 at which an end user press flexes the housing material inward and against a leaf spring 38 biasing device. Leaf spring 38 couples to a circuit board 44 under thin-walled section 36 to press upward against thin-walled section 36 for support to a neutral position when not pressed by an end user. This upward bias of leaf spring 38 helps to reduce risk of damage at the thin-walled material due to extraneous contact during normal use. A magnet 40 couples to a bottom surface of leaf spring 38 aligned vertically over a magnetometer integrated circuit 42 that measures magnetic flux, which varies based upon the vertical position of magnet 40. Magnetometer integrated circuit 42 may include a variety of sensors that detect magnetic fields and flux, such as Hall switch or compass. FIG. 2B depicts a similar arrangement for input button 32 with a leaf spring 54 biasing upwards against a thin-walled section of the housing and having a magnet 56 coupled to a lower side over a magnetometer 58 coupled to a circuit board 60. In each case, the leaf spring is a thin metal material, such as stainless steel, assembled to the circuit board always have some upward bias working against the thin-walled housing section so that no air gap exists between the metal material and housing at the upper arc of the leaf spring. In one example embodiment, a magnetometer magnetic sensor detects movements of 0.2 mm with a resolution of 0.01 mm so that relatively small movements flexing the housing thin-walled section inward can be sensed as an input.

When an end user presses on input button 32 or 34 to flex the thin-walled material inward, a magnetic sensor, such as a magnetometer, detects the change in magnetic flux due to the change in distance between the magnetic sensor and magnet, which sends an input signal trigger to the circuit board. When the end user releases the input button, the leaf spring and magnet return to the biased outward neutral position so that the magnetic sensor detects reduced magnetic flux and ceases the trigger signal to the circuit board. The thin-walled material at each input button flexes a small but perceptible amount of movement in response to an end user push. The movement is reinforced by the outward biasing of the leaf spring to provide an end user with additional feedback that an input has been completed. In FIG. 2A, an LED 52 is illuminated to indicate an input as further feedback to the end user. LED 52 is located below thin-walled material 36 where it extends over end cap 50 coupled at the end of the stylus housing. In the example embodiment, end cap 50 has an opening that allows external sounds to reach a microphone integrated circuit 48, such as a MEMS type microphone, that provides detected sounds to an audio integrated circuit 46, as is described in greater detail below.

Figure 3:
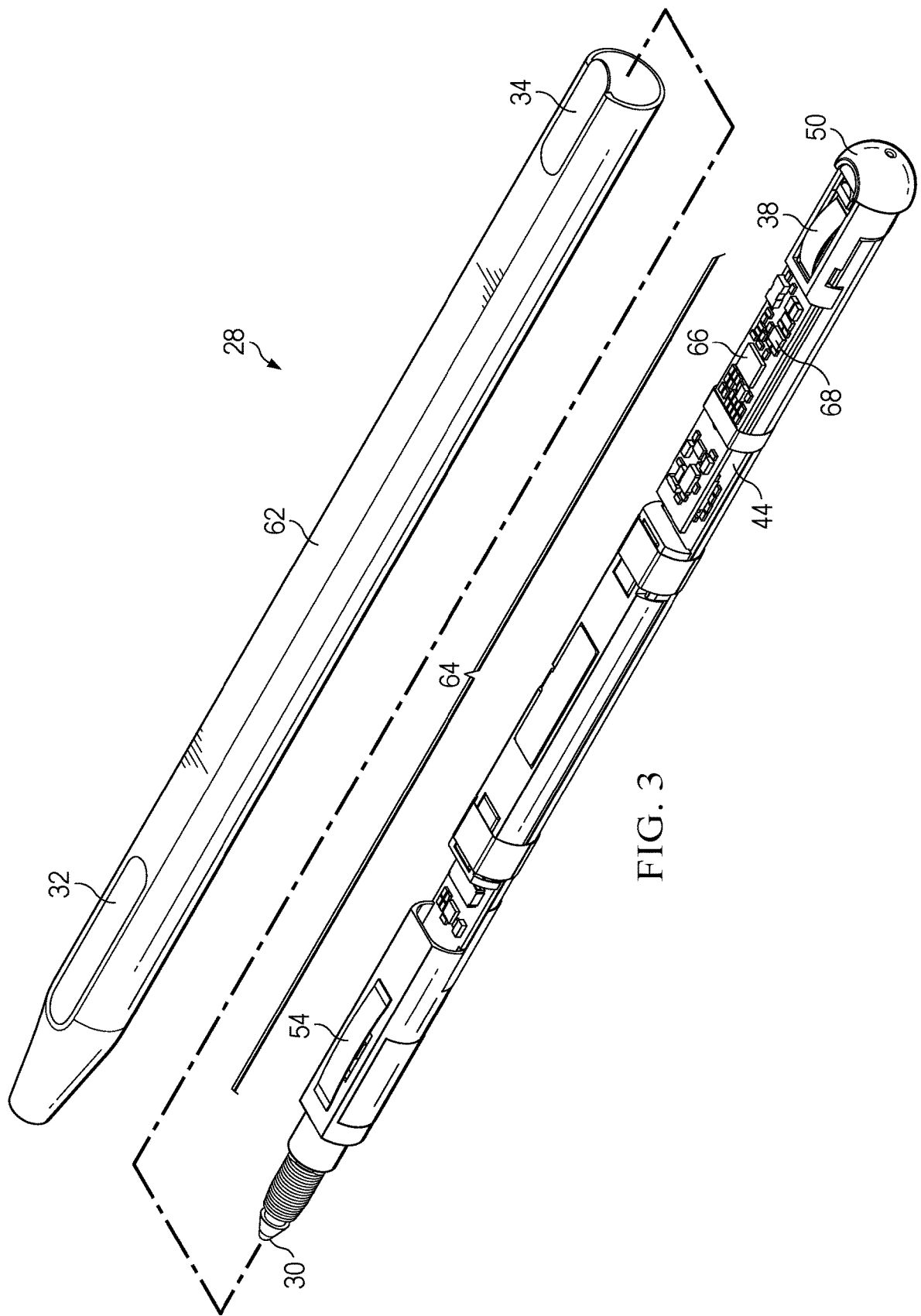
FIG. 3 depicts an exploded view of the stylus and a subassembly configured to slide into the stylus.

Referring now to FIG. 3, an exploded view depicts the stylus 28 and a subassembly 64 configured to slide into the stylus housing 62. Subassembly 64 is a structure that holds one or more circuit boards 44 ready to assemble into housing 62. Housing 62 is a body of contiguous material manufactured with a single shot of plastic material having thinner material at input buttons 32 and 34. In the example embodiment, the location of input buttons 32 and 34 are highlighted with a slight indent in the exterior surface to help an end user see and feel the location of the input buttons. Input button 34 extends past the end of housing 62 at the end cap opening to overlap end cap 50 when subassembly 64 inserts into housing 62 with writing tip 30 in the end cap opening, as depicted. Subassembly 64 includes leaf springs 38 and 54 built in locations to align with the thinner material of housing 62 at inputs buttons 34 and 32 respectively. A processing resource 66 coupled to circuit board 44 provides processing functions, such as execution of instructions to control stylus functions and radio communications, such as with a radio system on chip (SOC) solution. An accelerometer 68 senses accelerations, such with a three axis gyroscope configuration. When subassembly 64 fully inserts into housing 62, end cap 50 engages with the inner circumference of housing 62 to hold subassembly 64 in position so that writing tip 30 extends out the writing tip opening in positions to support stylus writing. In one example embodiment, end cap 50 may be held in place with additional coupling devices, such as screw or adhesive.

Figure 4:
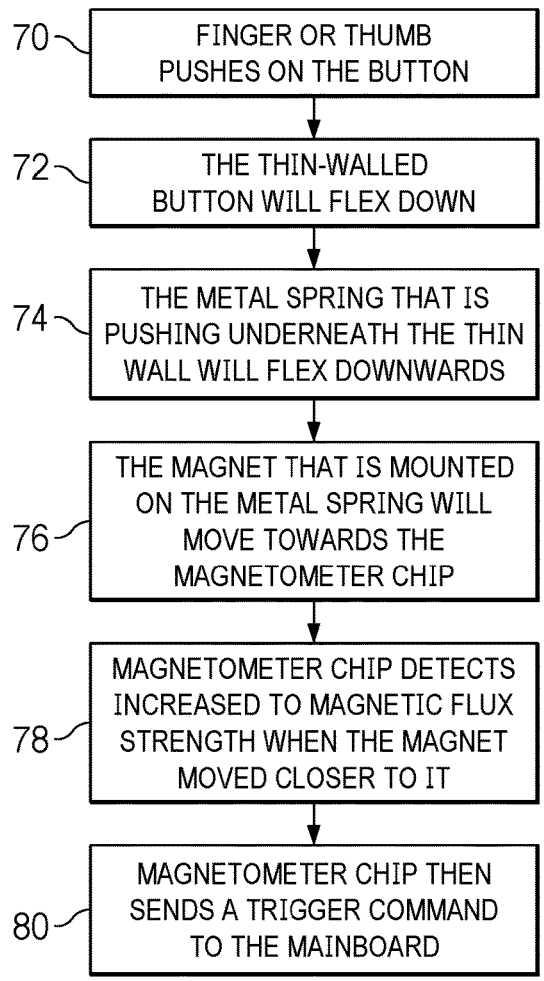
FIG. 4 depicts a flow diagram of a process to manage an input press at the stylus button.

Referring now to FIG. 4, a flow diagram depicts a process to manage an input press at the stylus. The process starts at step 70 with a finger or thumb press at an input button defined by an area of reduced material thickness in a contiguous material housing body. At step 72 the thin-walled portion of the housing flexes inward in response to the end user press. At step 74, the metal spring biasing outward at the inner side of the thin-walled housing portion is overcome to move inward. Although the example embodiment depicts a leaf spring, other types of springs or biasing devices may be used to bias outward at the thin-walled portion and change the position of the magnet in response to an end user press. At step 76, the magnet mounted on the leaf spring moves inward with the leaf spring and towards the magnetometer integrated circuit to increase the magnetic flux in proximity to the magnetometer. At step 78, the magnetometer integrated circuit detects the increased magnetic flux strength when the magnet moves in closer proximity. As is described above, other types of magnetic sensors may be used such as a Hall sensor. At step 80, when the detected magnet flux exceeds a defined limit an input trigger command is provided to the stylus circuit board and processing resource, such as to start a debounce timer that validates the input.

Figure 5:
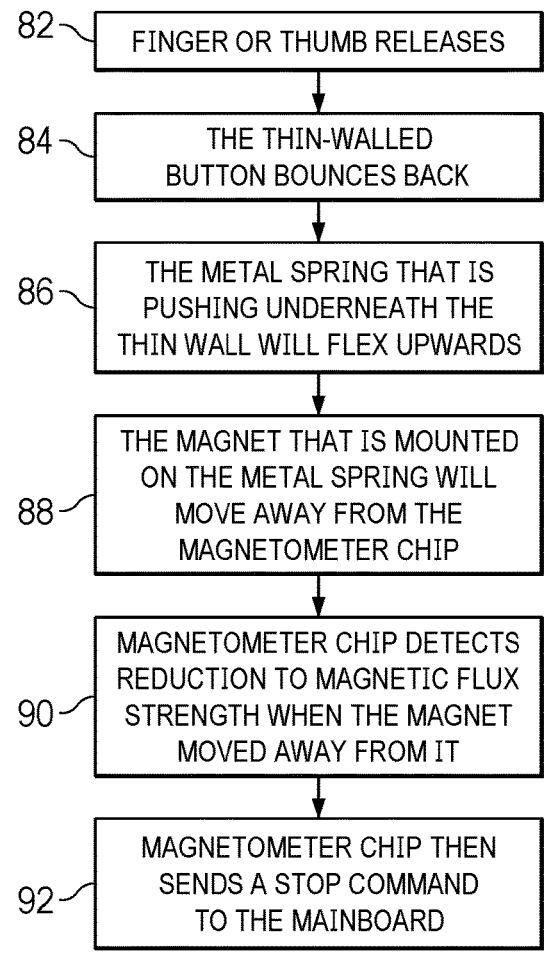
FIG. 5 depicts a flow diagram of a process to manage release of an input button at the stylus.

Referring now to FIG. 5, a flow diagram depicts a process to manage release of an input button at the stylus. At step 82 the end user finger or thumb releases pressure at the input button thin-walled section. At step 84, the leaf spring biases the thin-walled portion outward to the neutral position. At step 86 the leaf spring returns to the neutral position, raising the magnet at the bottom side of the leaf spring away from the magnetometer. At step 88 the magnet mounted on the bottom side of the leaf spring is raised and moved out of proximity to the magnetometer to reduce the magnetic flux below the strength associated with detection of the input. At step 90, the magnetometer detects reduction of the magnetic flux strength when the magnet moves a predetermined distance from the magnetometer. At step 92, the magnetometer integrated circuit responds to the reduced magnetic flux by sending a command to the circuit board and processing resource, such as a GPIO debounce signal that completes a timer detecting whether the input button press was sufficient to command an input. In one example embodiment, completion of an input may command illumination of an LED, such as the LED located at the end cap.

Figure 6:
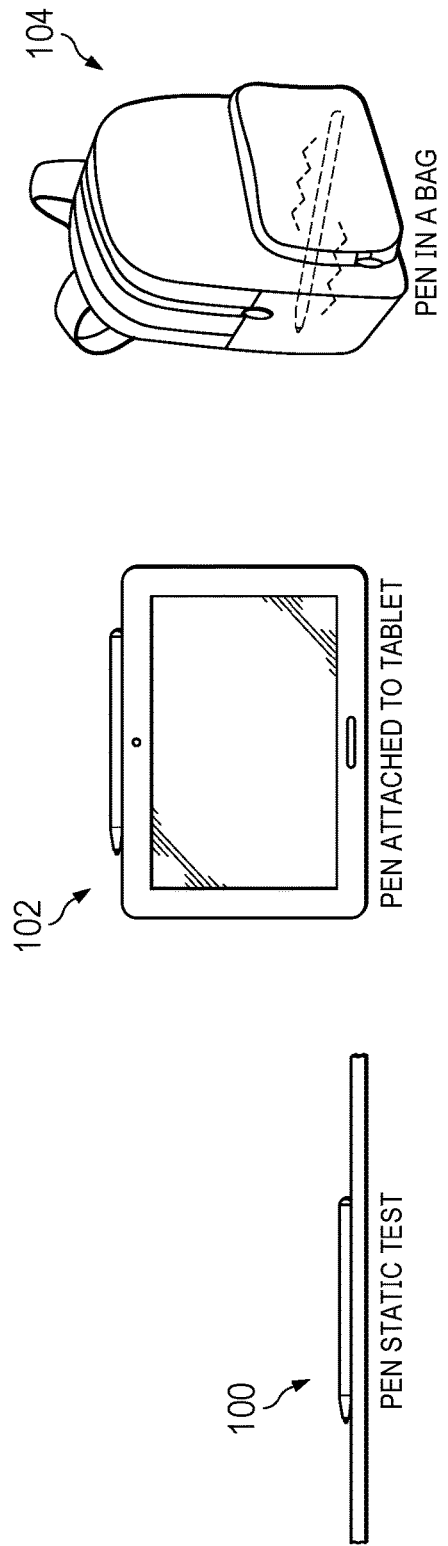
FIG. 6 depicts a variety of acceleration profiles associated with stylus movement and detected by an accelerometer in conjunction with other context.
Figure 6:
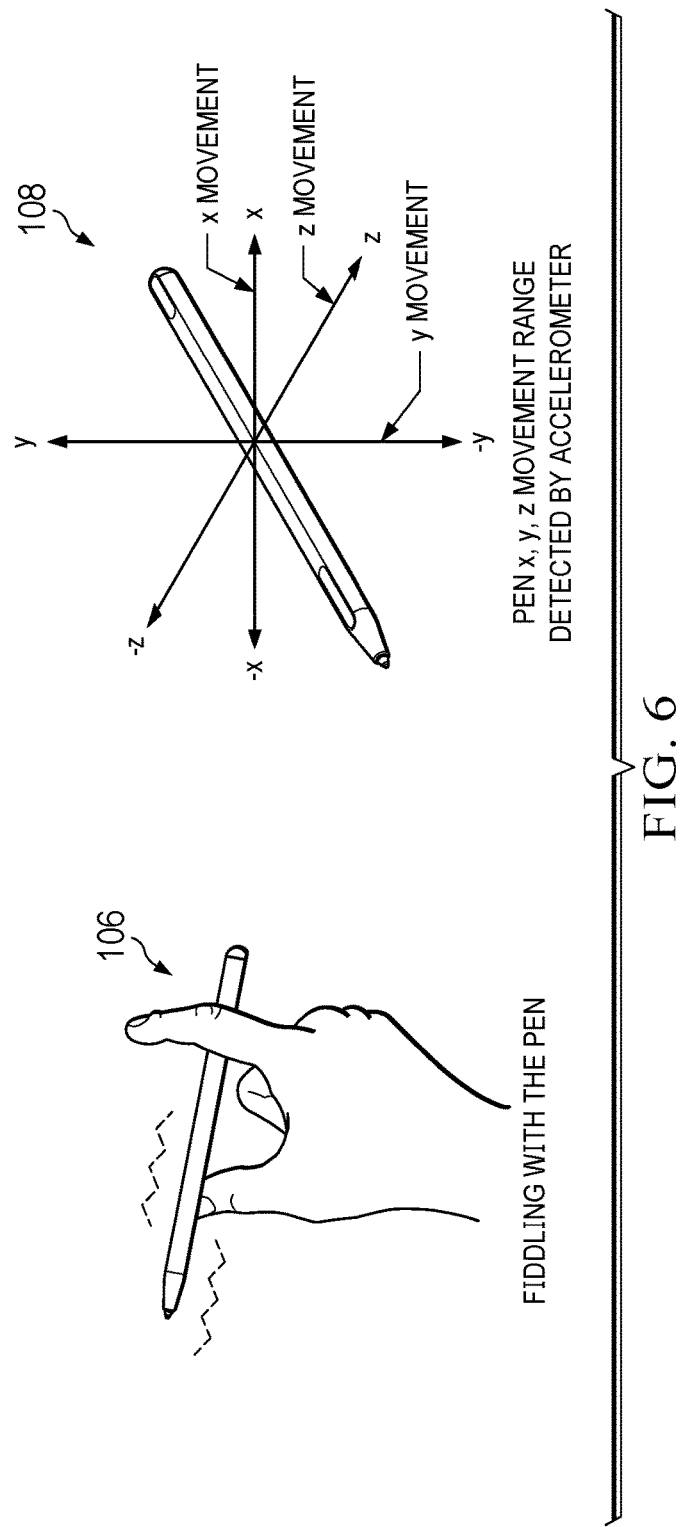

Referring now to FIG. 6, a variety of acceleration profiles are depicted that are associated with stylus movement and detected by an accelerometer in conjunction with other context. The stylus stores acceleration profiles associated with the different contexts in non-transitory memory, such as flash memory integrated in an accelerometer, and compares the sensed accelerations against the acceleration profiles, as shown by the example sensed acceleration axes 108, to manage a power consumption state of the stylus so that stylus battery life is enhanced. As an example, stylus power is consumed in an active state by writing tip active inking at approximately 100 to 150 microamps, by a Bluetooth processing resource, such as a SOC, in an idle mode at approximately 10 to 20 microamps and by an accelerometer at 8 to 9 microamps. In the example embodiment, a processing resource and non-transitory memory of the accelerometer execute logic that monitors the acceleration profiles so that the main processing resource and inking resources can sleep or even have power cutoff to avoid all power dissipation when the stylus is not in use. For instance, the stylus accelerations are tracked in x, y and z axes and compared against the acceleration profiles to determine when and how the main processing resource and inking are powered. In the static pen test 100, a lack of accelerations confirms the sleep state so that only accelerometer power is applied and the accelerometer logic may monitor for movement at increased time intervals. In the pen attached to stylus state 102, a confirmation of the stylus in a garaged position is an indication of a context associated with non-use of the stylus. The garaged state may be confirmed by detection of a charge applied to the stylus, such as with wireless charging, or a proximity detected with a magnet in the information handling system in proximity to a Hall sensor of the stylus. Alternatively, a physical switch or physical coupling of the stylus to the information handling system may indicate the garage state. In addition, the garage state may include a coupling to a different physical device rather than just an information handling system, such as a pocket protector or carrying case. A pen in a bag acceleration profile 104 may include acceleration patterns that mimic a person walking or that match the acceleration of an information handling system in the bag even though the stylus is not garaged. The fiddling with the pen profile 106 has random accelerations that are small time intervals associated with end user touches at the stylus. During such active profiles, the stylus main processing resource may be commanded active to monitor stylus power consumption and more rapidly respond to end user stylus interactions, such as by commanding inking to be activated when writing.

As an example, use of acceleration profiles, management of stylus power states is shifted between logic executing on the accelerometer processing resource and the main processing resource based upon sensed accelerations and other context. When a stylus rests without any movement for an extend time period, such as on a desktop for greater than a minute, power to all components other than the accelerometer may be cut off completely, such as with a hard off switch managed by the accelerometer, so that only the accelerometer consumes power. In this acceleration profile, logic stored in a non-transitory memory of the accelerometer executes on a processing resource integrated in the accelerometer to monitor for stylus movement and, in the meanwhile, manage a minimum power consumption. When movement is detected, the stylus may wake to a standby power state that provides main processing resource functions to perform a greater analysis of context or the accelerometer processing resource may be used until an end user active state is deemed appropriate. In some situations, a lack of movement for an extended time period may result in the accelerometer commanding a hard off by cutting off power draw from the battery, although this power state will generally need recovery by an end user input, such as pressing a power button.

Once the accelerometer detects motion to wake the stylus from the sleep state, the context is determined and applied to manage power at the stylus. In one example embodiment, the context is broken into a static environment and a dynamic environment. In a static environment, such as when the stylus rests on a desktop surface, the stylus sleeps with accelerator-only monitoring until motion is detected. When motion is detected, the stylus comes to a full active state with the main processor and inking active, and monitors for normal use for a one minute period, such as touches at the writing tip and accelerations associated with end user writing with or handling of the stylus. The stylus remains awake until the context indicates a static environment and no accelerations are detected for one minute, after which the stylus sleeps again in an accelerometer-only monitoring mode. In a dynamic environment, accelerations are detected without actual use of the stylus in an active write mode, such as detection of inking by the writing tip. As an example, an end user fiddling with the stylus or packing the stylus in a backpack where it bounces around will create a good number of accelerations not associated with normal use. In such a dynamic situation, extending battery life of the stylus relies upon discernment of situations that will result in active stylus inking. Further, anticipating active stylus inking provides a rapid response so that the stylus is prepared to write when the end user desires to write. In a dynamic environment with accelerator-only monitoring, at initial detection of an acceleration the stylus is woke to a standby state as above and a check is made to determine if the stylus is garaged, such as by checking to determine if a wireless charger is present. When the stylus is garaged, dynamic accelerations that match a walking profile may indicate that the stylus is in a backpack so that the stylus may wake less frequently to check for use, thus reducing power consumption and allowing logic of the accelerometer integrated processing resource to manage power. Although the example embodiment wakes to a full standby state to use the main processing resource to determine if the stylus is garaged, in an alternative embodiment a GPIO from a charger or a Hall sensor directly to the accelerometer may be used so that the accelerometer logic can determine whether the stylus is garaged without waking the main processing resource.

In a dynamic environment, when a garaged status is not detected, the stylus applies logic in an accelerometer only mode that helps to maintain reduced power consumption where the stylus is not in active use yet remain available to quickly respond when an end user initiates inking. If the stylus is not garaged, an initial standby state is commanded with the main processing resource active to analyze motion, such as identifying an acceleration profile associated with walking or fidgeting. If any context indicates active use of the stylus by an end user, such as pressure on the writing tip or button presses, the stylus remains in the standby state ready to initiate inking. In the dynamic environment with a context of active use, the stylus may apply more frequent checks in the standby state to detect active use before commanding a sleep state after a predetermined time. If a predetermined time passes without context indicating inking by an end user, the stylus sets a "shaking" bit of the accelerometer to indicate a dynamic environment and then commands a standby mode with accelerometer only monitoring. When the shaking bit is set, a variety of wake logics may be applied based upon the context at the time that the shaking bit is set, such as a walking profile or a fiddling profile. In one example embodiment, a wake interval of three seconds is set in the dynamic environment to check for active use and then monitoring with accelerometer only is commanded. Other intervals and types of monitoring may be used, such as by setting the dynamic environment acceleration profile in the accelerometer and monitoring with the accelerometer only unless a change in the acceleration profile is detected, such as walking changing to rest. At the detection of a change of the acceleration profile by the accelerometer logic, a wake of the stylus main resource may be performed to determine the context and reset the type of acceleration profile monitored by the accelerometer only logic. In this way, monitoring by the accelerometer detects changes to the acceleration profile with a low power consumption and wakes the main processing resource to reprogram the accelerometer for the next acceleration profile to monitor so that power consumption is reduced while stylus context is monitored with greater accuracy.

Figure 7:
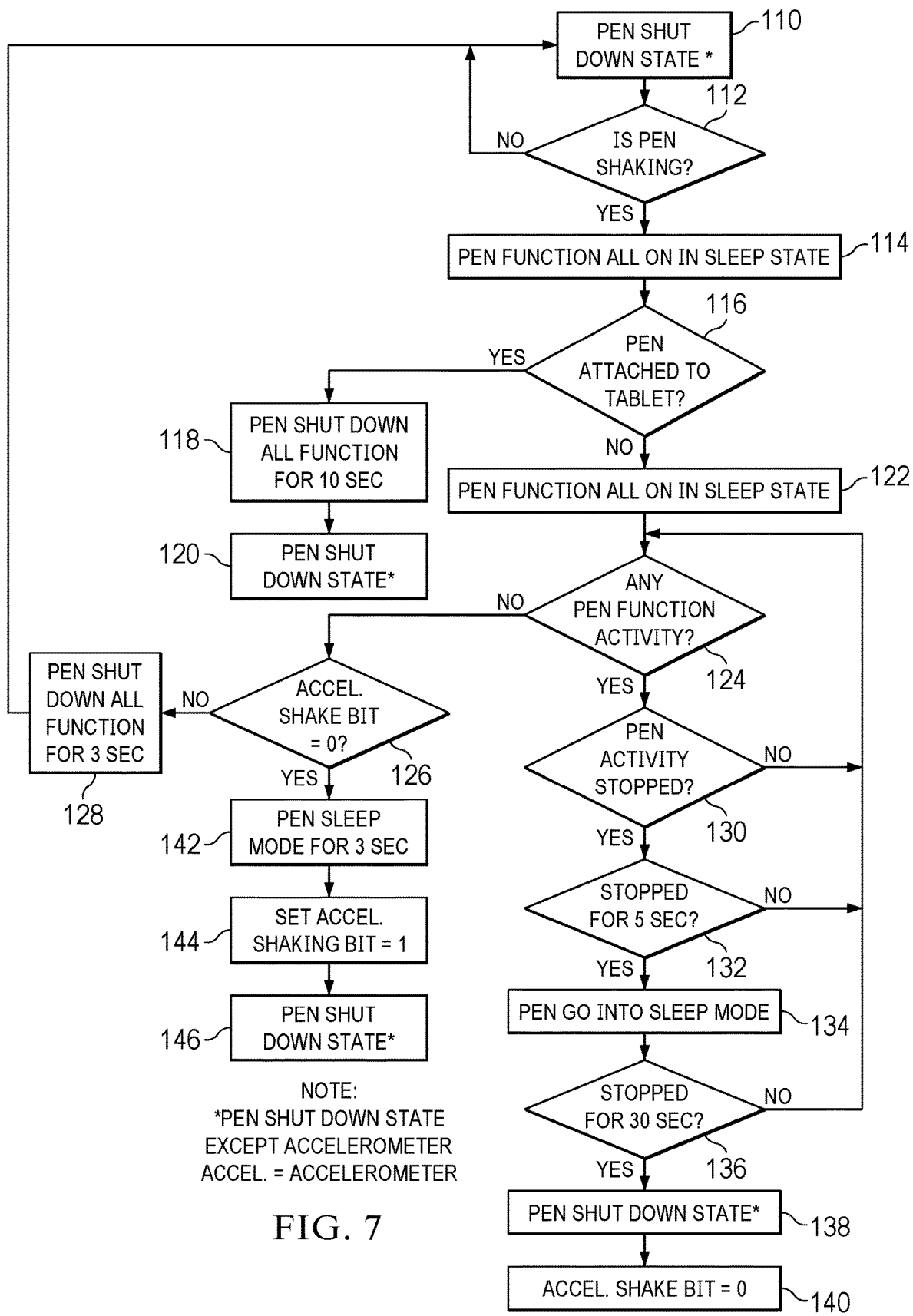
FIG. 7 depicts a flow diagram of a process for managing stylus power based upon acceleration profiles and context.

Referring now to FIG. 7, a flow diagram depicts a process for managing stylus power based upon acceleration profiles and context. The process starts at step 110 with the stylus in a shut down state except for monitoring by logic executing on a processing resource integrated in the accelerometer. At step 112 a determination is made of whether the stylus is shaking and, if no accelerations of at least a predetermined minimum are detected, the process returns to step 110 to continue in the shut down state. If accelerations are detected at step 112, the process continues to step 114 to wake pen functions all on in a sleep state, for example by waking the main processor while sleeping the ink function, and to step 116 to determine if the stylus is attached to a tablet information handling system or otherwise garaged. When the stylus is garaged, the logic assumes a static environment of nonuse and, at step 118 monitors the context to confirm the nonuse. At step 120 after nonuse, the stylus enters the shut down state with monitoring performed by logic executed on the accelerometer processing resource with logic stored in non-transitory memory accessible by the accelerometer processing resource. During the ten seconds of monitoring, the stylus main processing resource may program the context and monitoring logic applicable to the accelerometer processing resource. For instance, the wake interval for a garaged stylus may be increased so that power consumption is reduced and the logic may simply check to confirm a garage status at each wake so that a minimal power consumption is used until the stylus leaves the garaged status, at which time accelerations may be monitored or a wake to reprogram the context may be performed.

If at step 116 the stylus is not garaged, such as with attachment to the tablet information handling system, the process continues to step 122 to wake the stylus functions in a sleep state. For example, the stylus main processing resource and radio wake to check the stylus context, such as the presence of a tablet information handling system radio or a press by the writing tip on a touchscreen display. At step 124, if the stylus does not have a context of active use, such as inking, the process continues to step 126 to determine if a "shaking" bit of the stylus is set to zero. The shaking bit indicates whether the stylus has been in a sleep mode with a static or dynamic environment. If the shaking bit is set to one, the process continues to step 128 to power down the stylus for three seconds and then return to step 110 to continue monitoring for active use. The wake interval of three seconds with monitoring only by the accelerometer provides a minimal drain on battery charge and sufficient monitoring that will capture a change in context to an active user state so that the stylus is prepared for use when an end user starts inking. If at step 126 the shaking bit is set to zero, the process continues to step 142 to sleep the stylus for three seconds to ensure the dynamic environment nonuse state, and then the shaking bit is set to one at step 144. At step 146 the stylus is placed in the shut down state so that monitoring continues at step 110 with the shaking bit set at one.

If at step 124 the stylus wakes to detect a context of end user engagement with inking functions, the process continues to step 130 in a full wake state to support active use and continues monitoring active use at step 124 until stylus activity has ended. When at step 130 the stylus context indicates that stylus use is complete, such as completion of inking and a predetermined amount of time without accelerations or detection of a garaged status, the process continues to step 132 to first confirm completion of functional use with five seconds of no accelerations and then to step 134 to sleep the stylus with the accelerometer monitoring for accelerations. At step 136 the stylus is monitored for acceleration for thirty seconds, returning to step 124 until the timer indicates completion of the monitoring. If steps 124 through 134 complete for thirty seconds without further functional use of the stylus, then at step 136 the process continues to step 138 with the stylus transition to a shut down state and step 140 with the accelerometer shake bit set to zero, indicating a static environment in the shutdown state.

Figure 8A:
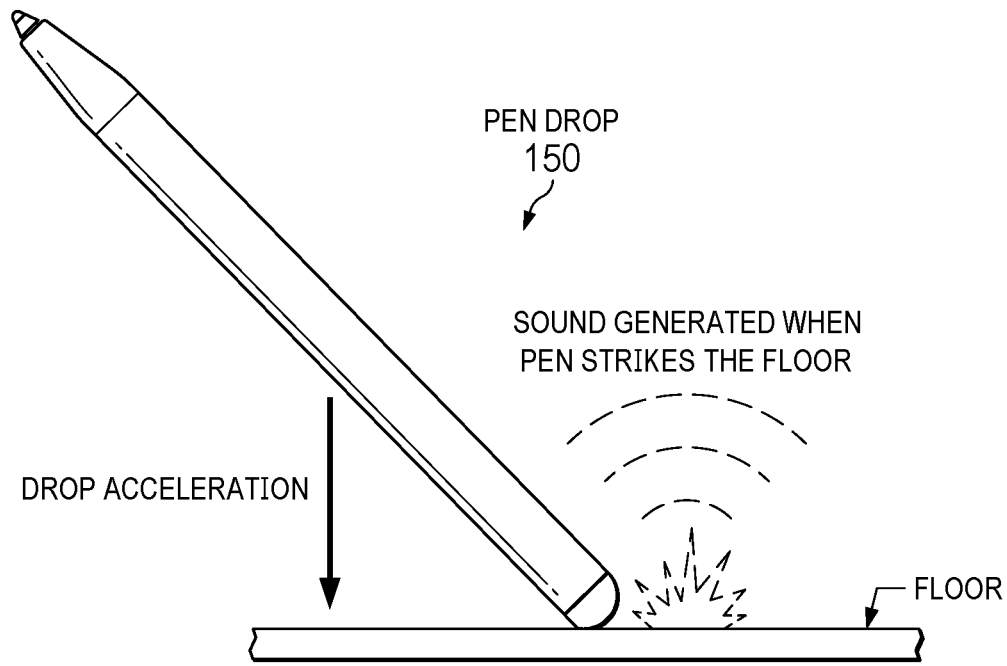
FIGS. 8A and 8B depict examples of sound monitoring with a stylus microphone to detect stylus context.
Figure 8B:
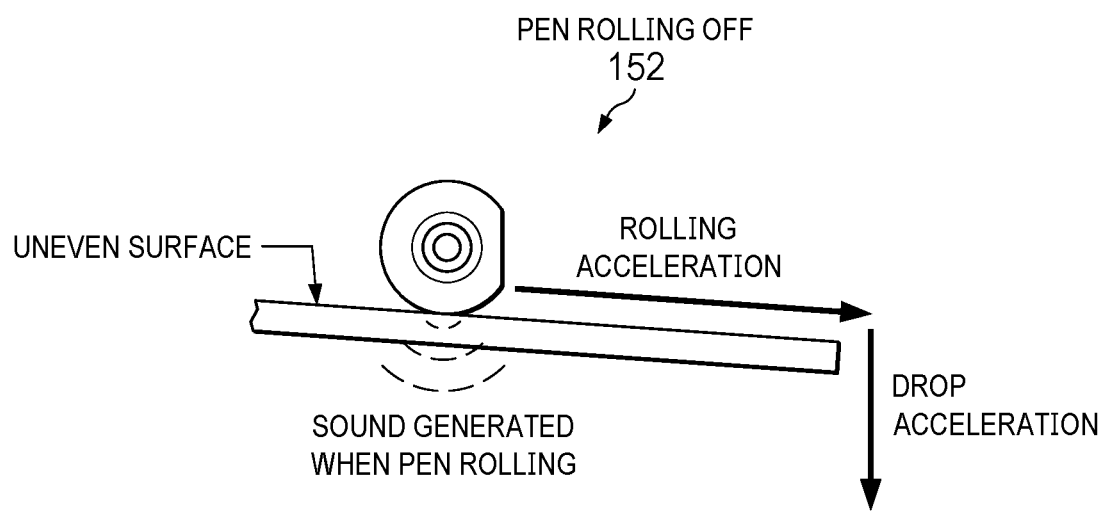

Referring now to FIGS. 8A and 8B, examples depict sound monitoring with a stylus microphone to detect stylus context. The microphone in stylus provides additional information regarding context to help manage power consumption and to track stylus position and availability to an end user. FIG. 8A depicts an example pen drop acceleration profile 150 in which a stylus drops and impacts a floor creating an impact noise. The pen drop profile is detectable both by a freefall detection of the accelerometer and the impact acceleration. The accelerometer may wake the stylus main processing resource through a GPIO input at detection of freefall or impact accelerations. In addition, the accelerometer may wake the microphone so that the sound of the impact is detected and an indication of the impact is radio communicated back to the tablet information handling system, thus allowing the system to track the location at which the impact occurred. In addition, orientation determined by the accelerometer may be captured at the impact to determine if the stylus writing tip sustained the force of the impact, such as when the writing tip is oriented downward at the time of the impact. FIG. 8B depicts an example pen rolling off acceleration profile 152 in which a stylus rolls on a desktop surface to generate a rolling sound picked up by the microphone. In both the impact and the rolling scenarios, the microphone may be used to detect the context with or without the accelerometer. For instance, the microphone may monitor sounds in a low power mode with an integrated processing resource that wakes the rest of the stylus if a detected sound matches an impact or rolling sound pattern. Alternatively, the accelerometer may wake the microphone when a freefall or a rolling acceleration profile is detected to help confirm the context of the stylus. In alternative embodiments, other types of sounds may be monitored by the microphone to determine the stylus context, such as the sound of typing as an indication of end user engagement with an information handling system, the sound of multiple voices to indicate a multiperson conversation, such as may indicate sharing of a tablet view and anticipated stylus use, or the sound of one voice to indicate a telephone conversation.

Figure 9:
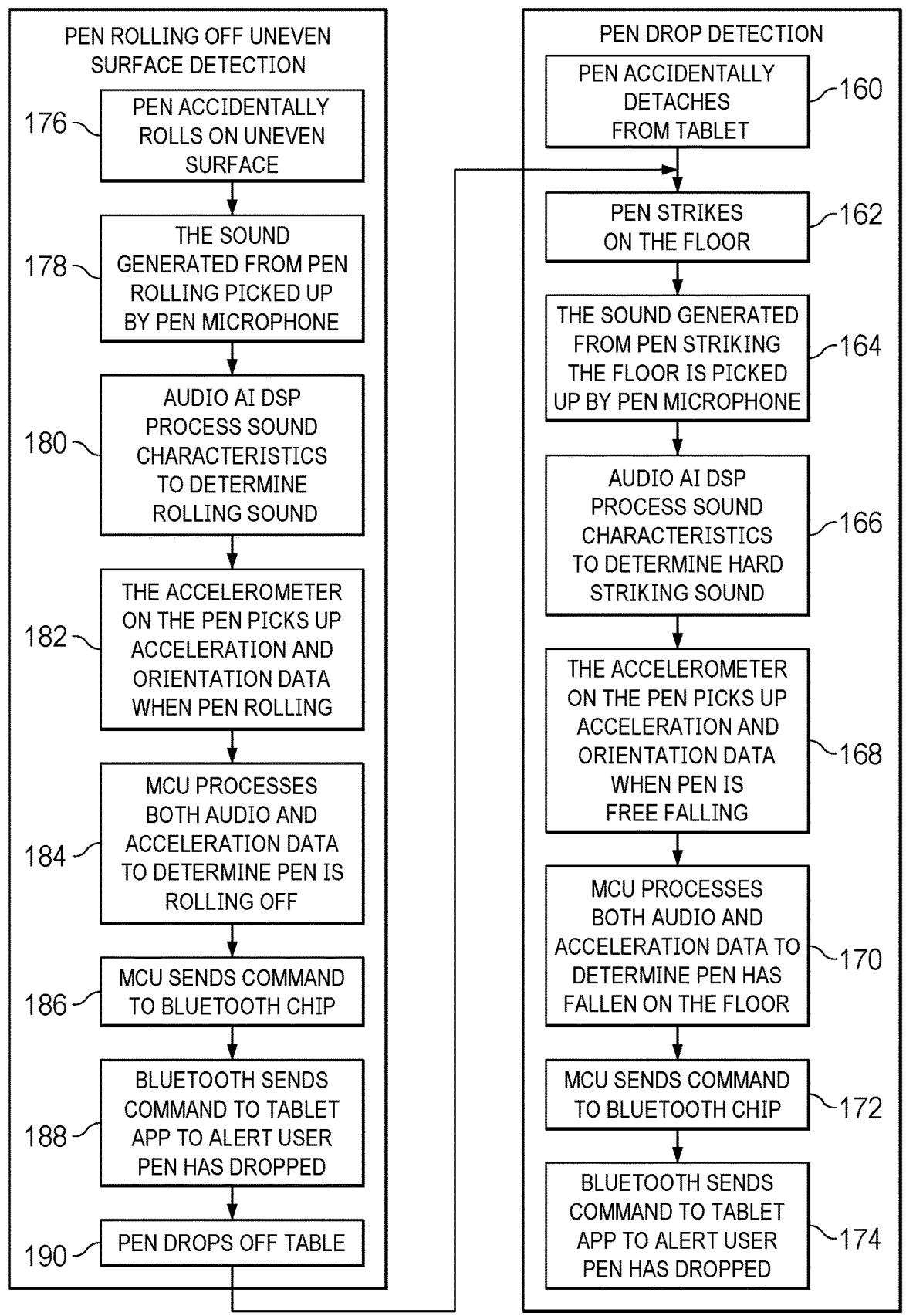
FIG. 9 depicts a flow diagram of a process for managing stylus power and position reporting based upon microphone and acceleration detection of various contexts.

Referring now to FIG. 9, a flow diagram depicts a process for managing stylus power and position reporting based upon microphone and acceleration detection of various contexts. The process starts at step 176 with the stylus rolling across an uneven surface, such as a desktop. At step 178, the sound generated by the rolling stylus is detected by the stylus microphone. Note that the microphone may monitor for the sound with the stylus in a sleep state, may be awakened by the accelerometer or may detect the rolling sound during normal use. At step 180, an artificial intelligence DSP of the microphone or its audio processor process the sound characteristics to determine the rolling sound. At step 182, the accelerometer in the stylus detects the changes in orientation due to rolling, such as with a gyroscope defined by accelerations detected with accelerometers aligned along three axes. At step 184, the stylus main processing resource processes both the audio and acceleration data to determine the context of the stylus as rolling on a desktop surface. In response to the detected context, at step 186 the main processing resource commands communication by Bluetooth radio to the tablet information handling system. At step 188, the Bluetooth logic on the tablet information handling system communicates to an application of the information handling system regarding the stylus context so that the position of the system can be stored and the end user can be alerted to the unstable position of the stylus.

At step 190 of the example embodiment, the stylus continues to roll until it falls from the desktop. As an alternative, at step 160, the pen may accidentally detach from a garaged state at the tablet information handling system to fall without first rolling on the desktop surface. In both embodiments, at step 160 a freefall acceleration state may be detected at the accelerometer and communicated by Bluetooth to the tablet information handling system. Further, the freefall state may generate a GPIO signal to wake the stylus so that the main processing resource, such as an MCU, is available to process context information. At step 162 the stylus hits the floor with a resulting change from a freefall acceleration state to a high g-force reading and an impact that creates an impact sound. At step 164 the impact sound generated by the stylus hitting the floor is captured by the microphone and stored in local memory. At step 166, an audio artificial intelligence DSP processes the sound captured by the microphone and analyzes the characteristics to determine that the sound is the stylus striking a hard surface. At step 168, the accelerometer of the stylus picks up and stores acceleration and orientation information while the stylus is in freefall and at impact. At step 170 the stylus processing resource analyzes both the acceleration and audio information to determine that the stylus has fallen to the floor and the orientation of the stylus at impact. As an example, an orientation at impact of the writing tip down can indicate a risk of damage to the writing tip so that the stylus can provide a message to the tablet information handling system regarding this risk. At step 172 the stylus processing resource communicates a message to the Bluetooth radio regarding the stylus event. At step 174, the Bluetooth radio communicates to the tablet information handling system to report the stylus falling event so that the system can track the position at which the fall took place and any potential damage based upon the orientation of the stylus at impact.

Although the present invention has been described in detail, it should be understood that various changes, substitutions and alterations can be made hereto without departing from the spirit and scope of the invention as defined by the appended claims.

What is claimed is:

1. An information handling system comprising:
    a housing;
    a processor disposed in the housing and operable to execute instructions that process information;
    a memory disposed in the housing and interfaced with the processor, the memory operable to store the instructions and information;
    a display coupled to the housing and having a touchscreen interfaced with the processor to detect touch inputs; and
    a stylus separate from the housing having a cylindrical housing with a writing tip extending from one end, the cylindrical housing having a material of a first thickness and having a button formed with the material and defined by the material of a second thickness of less than the first thickness, the material continuous between the first and second thicknesses, the button is located at a second end opposite the first end and extending outward from the cylindrical housing material of the first thickness to overlap an end cap coupled to the second end.

2. The information handling system of claim 1 further comprising:
    a spring disposed in the housing at the button and biasing the button outward; and
    a sensor disposed under the button to detect an inward press at the button.

3. The information handling system of claim 2 wherein the spring comprises a leaf spring disposed over the sensor.

4. The information handling system of claim 3 further comprising:
    a magnet coupled to the leaf spring;
    wherein the sensor comprises a magnetometer operable to detect increased magnetic flux at a button press, the button press overcoming the leaf spring biasing to bring the magnet in closer proximity to the magnetometer.

5. The information handling system of claim 4 further comprising first and second of the button, the first located proximate the writing tip, the second located at an end opposite the writing tip.

6. The information handling system of claim 4 wherein the cylindrical housing comprises a single shot plastic material having a writing tip opening at a first end sized to fit through the writing tip and an end cap opening at the second end opposite the writing tip.

7. The information handling system of claim 6 further comprising:
    a circuit board;
    a processing resource coupled to the circuit board and interfaced with the sensor to detect button presses; and
    a subassembly tray coupled to the circuit board and sized to slide into the cylindrical housing with the writing tip at a first end and an end cap at an opposing second end.

8. The information handling system of claim 7 further comprising:
    a light coupled to the subassembly tray to align under the button at the overlap.

9. A method for performing inputs at a stylus, the method comprising:
    forming the stylus housing and button with a material having a reduced thickness at the button, the material continuous between the housing and the button, the material of reduced thickness defining the button extending out at one end of the stylus housing past the material of the stylus housing having the full thickness;
    applying a bias from within the housing outward at the button; and
    sensing a press at the button inward to the housing that overcomes the bias.

10. The method of claim 9 further comprising:
    applying the bias with a leaf spring pressing upward at a central location of the button; and
    detecting the button press based upon an inward movement of the leaf spring.

11. The method of claim 10 further comprising:
    coupling a magnet to the leaf spring; and
    detecting the press at the button with a magnetometer disposed in the stylus housing proximate the magnet.

12. The method of claim 11 further comprising:
    coupling an end cap at one end of the stylus housing.

13. The method of claim 12 further comprising illuminating a light under the button at the overlap.

14. The method of claim 11 further comprising:
    extending a writing tip from an opening at one end of the stylus housing; and
    forming the button proximate the writing tip.

15. The method of claim 14 further comprising forming the stylus housing with a single shot plastic injection molding to have body of continuous material between the opening for the writing tip and an end cap opening at an opposing end.

16. A stylus comprising:
    a housing of a material between a writing tip opening at a first end and an end cap opening at an opposing second end, the material defining an input button with an area of reduced thickness of the material, the material continuous for the housing including between the housing and the input button area of reduced thickness;
    an end cap coupled over the end cap opening at the second end, the input button area of reduced thickness overlaps the end cap to extend over a portion of the end cap; and
    a leaf spring disposed in the housing under the button to apply an outward biasing force at the button.

17. The stylus of claim 16 further comprising:
    a magnet coupled to the leaf spring; and
    a magnetic sensor disposed under the magnet and operable to detect a press at the button, the press bringing the magnet in closer proximity to the magnetic sensor.

18. The stylus of claim 17 further comprising a light aligned under the input button at the overlap.

* * * * *